United States Patent [19]

Sogo

[11] Patent Number: 6,078,824
[45] Date of Patent: Jun. 20, 2000

[54] WIRELESS BASE STATION EQUIPMENT

[75] Inventor: Hiroyuki Sogo, Kawasaki, Japan

[73] Assignee: Fujitsu Limited, Kanagawa, Japan

[21] Appl. No.: 08/911,775

[22] Filed: Aug. 15, 1997

[30] Foreign Application Priority Data

Feb. 17, 1997 [JP] Japan ..................................... 9-032102

[51] Int. Cl.⁷ .................................................. H04B 1/38
[52] U.S. Cl. ........................... 455/562; 455/522; 455/69; 342/152; 342/372
[58] Field of Search ..................................... 455/561, 562, 455/522, 69, 62, 63, 279.1; 342/372, 154, 157, 152

[56] References Cited

U.S. PATENT DOCUMENTS

| 4,249,181 | 2/1981 | Lee ............................................ 455/447 |
| 4,694,484 | 9/1987 | Atkinson et al. ......................... 455/561 |
| 5,513,176 | 4/1996 | Dean et al. ............................ 455/276.1 |
| 5,533,011 | 7/1996 | Dean et al. ............................... 455/276 |
| 5,551,060 | 8/1996 | Fujii et al. ............................... 455/562 |
| 5,724,666 | 3/1998 | Dent ......................................... 455/562 |
| 5,806,001 | 9/1998 | Yokota ..................................... 455/562 |
| 5,873,048 | 2/1999 | Yun ........................................... 455/562 |

FOREIGN PATENT DOCUMENTS

| 2-67020 | 3/1990 | Japan . |
| 2-132926 | 5/1990 | Japan . |
| 4-322521 | 11/1992 | Japan . |
| 5-63634 | 3/1993 | Japan . |
| 8-37482 | 2/1996 | Japan . |

*Primary Examiner*—Nguyen Vo
*Assistant Examiner*—Greta J. Fuller
*Attorney, Agent, or Firm*—Helfgott & Karas, PC.

[57] ABSTRACT

A wireless base station equipment includes a transmission power controlling unit for controlling a transmission power of a transmitted signal to be transmitted to a mobile station in accordance with a status of signal reception from the mobile station and a beam tilt angle varying unit for varying a beam tilt angle of an antenna formed with respect to a horizontal plane, based on the level of transmission power control by said transmission power controlling unit.

7 Claims, 16 Drawing Sheets

WIRELESS BASE STATION EQUIPMENT

BACKGROUND OF THE INVENTION

1. Field of the Invention

The present invention generally relates to wireless base station equipment and, more particularly, to wireless base station equipment in a mobile communication system.

Recently, efforts have been undertaken to develop communication methods for a mobile communication system which use frequencies efficiently. The growing importance is being attached to the Code Division Multiple Access (CDMA) technology because it can achieve high-capacity communication.

2. Description of the Related Art

FIG. 1 is a block diagram showing a conventional CDMA wireless base station equipment. Referring to FIG. 1, data to be transmitted is encoded by an encoder 10 using spread spectrum technique and is converted into an analog signal by a D/A converter 12. A modulator 14 modulates the analog signal using, for example, quadrature modulation technique. The modulated signal is amplified by a variable-gain amplifier 16 and is turned into a high-frequency signal by a frequency converting circuit 18. The high-frequency signal is amplified by a high-power amplifier (HPA) 20 and is supplied to an antenna 26 via a duplexer 22 and a coaxial cable 24.

The high-frequency signal received via the antenna 26 is supplied to a low-noise amplifier (LNA) 20 via the coaxial cable 24 and the duplexer 22. The signal amplified by the low-noise amplifier 20 is turned into an IF signal by a frequency converting circuit 32. The IF signal is supplied to a demodulator 36 via an AGC amplifier 34 for quadrature demodulation. The demodulated signal is converted into a digital signal by an A/D converter 38. A decoder 40 decodes the digital signal using the spread spectrum technique and outputs the decoded signal.

For example, Japanese Laid-Open Patent Application No. 4-322521 teaches varying the transmission power of a wireless base station depending on the number of used channels. More specifically, the base station drops the transmission power thereof when the ratio between used channels and available channels exceeds a predetermined level, so as to reduce a cell size. As a result of the drop, mobile stations outside the size-reduced cell become incapable of receiving a signal from the base station and are forced to communicate with another base station. In this way, the number of used channels is prevented from increasing.

When the transmission power of a base station drops, the surrounding mobile stations receive less signal power. That is, the cell size is reduced in terms of coverage of the base station. However, no change results in the reception of the base station. Even after the reduction in the transmission power, the base station continue to receive spurious radiation from the mobile stations outside the size-reduced cell of the base station. In the CDMA system, if the power of the spurious radiation exceeds a predetermined level, a band-limited signal is lost in the spurious radiation, resulting in a failure for the base station to discern a desired signal from the spurious radiation. Channel capacity in the CDMA system is determined by a ratio between the power of received spectrum-spread signals and the power of a decoded bandlimited signal. Unless there is a reduction in the power of spurious radiation, the benefit of increased channel capacity is not produced.

One conceivable way to control the spurious reception level is to vary the tilt angle of an antenna provided in a base station in accordance with the number of used channels. However, if the transmission power is fixed, the transmission power at a boundary of a cell remains relatively high. Since a mobile station chooses a host base station based on the level of electric field intensity of a control signal received from a plurality of base stations, the conventional system has a disadvantage in that it cannot ensure that a mobile station located at a boundary of a cell cannot be smoothly handed off to another base station.

SUMMARY OF THE INVENTION

Accordingly, a general object of the present invention is to provide wireless base stations for a mobile communication system in which the aforementioned disadvantage is eliminated.

Another and more specific object of the present invention is to provide a wireless base station in which the cell size can be controlled in accordance with the number of used channels and in which the channel capacity is prevented from being reduced due to spurious radiation.

In order to achieve the aforementioned objects, the present invention provides a wireless base station equipment comprising: transmission power controlling means for controlling a transmission power of a signal to be transmitted to a mobile station in accordance with a status of signal reception from the mobile station; and beam tilt angle varying means for varying a beam tilt angle of an antenna formed with respect to a horizontal plane, based on the level of transmission power control by the transmission power controlling means.

According to the wireless base station of the present invention, the transmission power is increased or reduced depending on the status of reception from the mobile stations. By varying the beam tilt angle of the antenna, the cell size can be controlled so as to adapt for the number of used channels. Therefore, it is possible to prevent the channel capacity from being reduced due to the spurious radiation.

BRIEF DESCRIPTION OF THE DRAWINGS

Other objects and further features of the present invention will be apparent from the following detailed description when read in conjunction with the accompanying drawings, in which.

DESCRIPTION OF THE PREFERRED EMBODIMENTS

Figure 1:
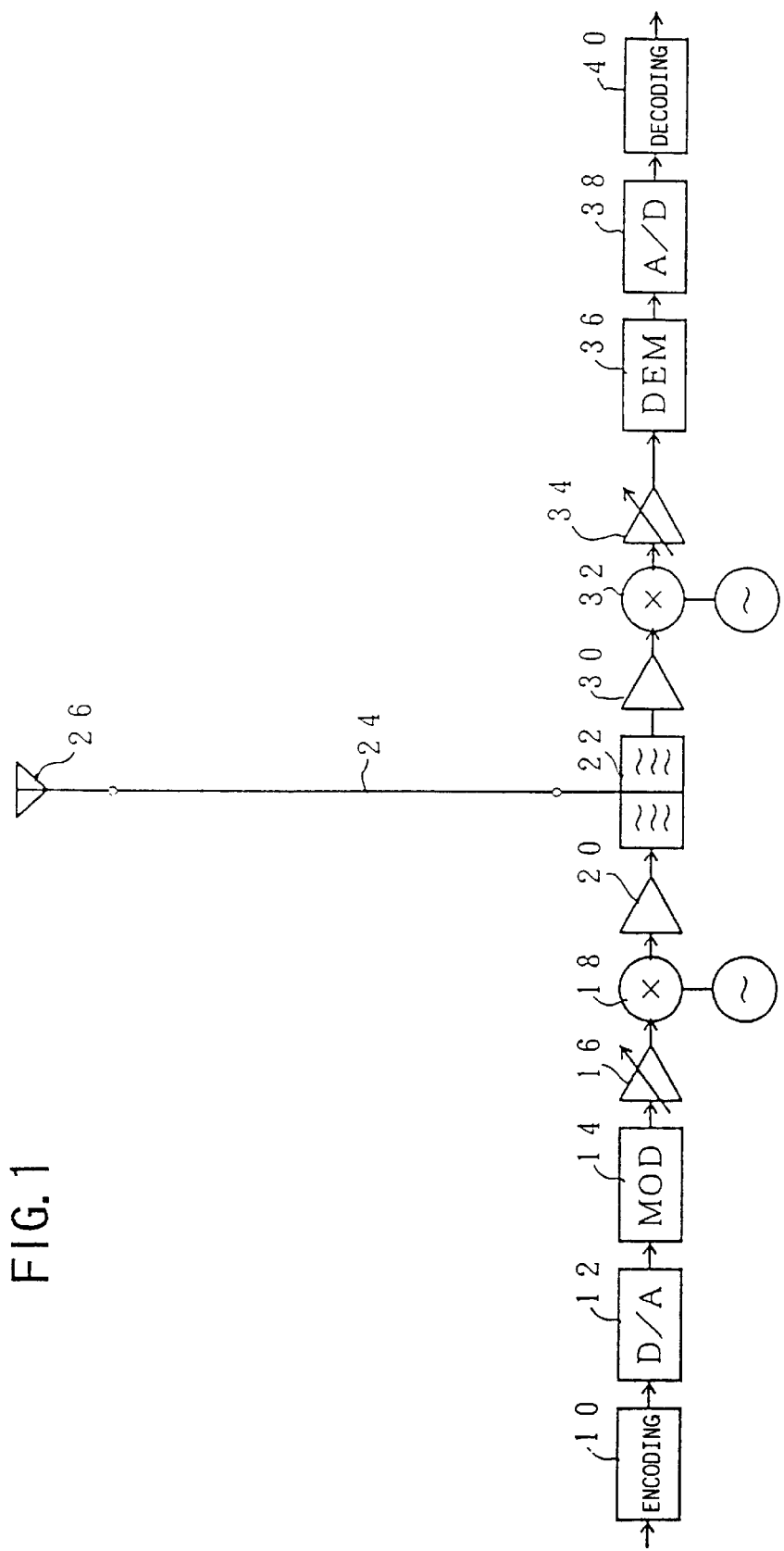
FIG. 1 is a block diagram showing a conventional CDMA wireless base station equipment.
Figure 2:
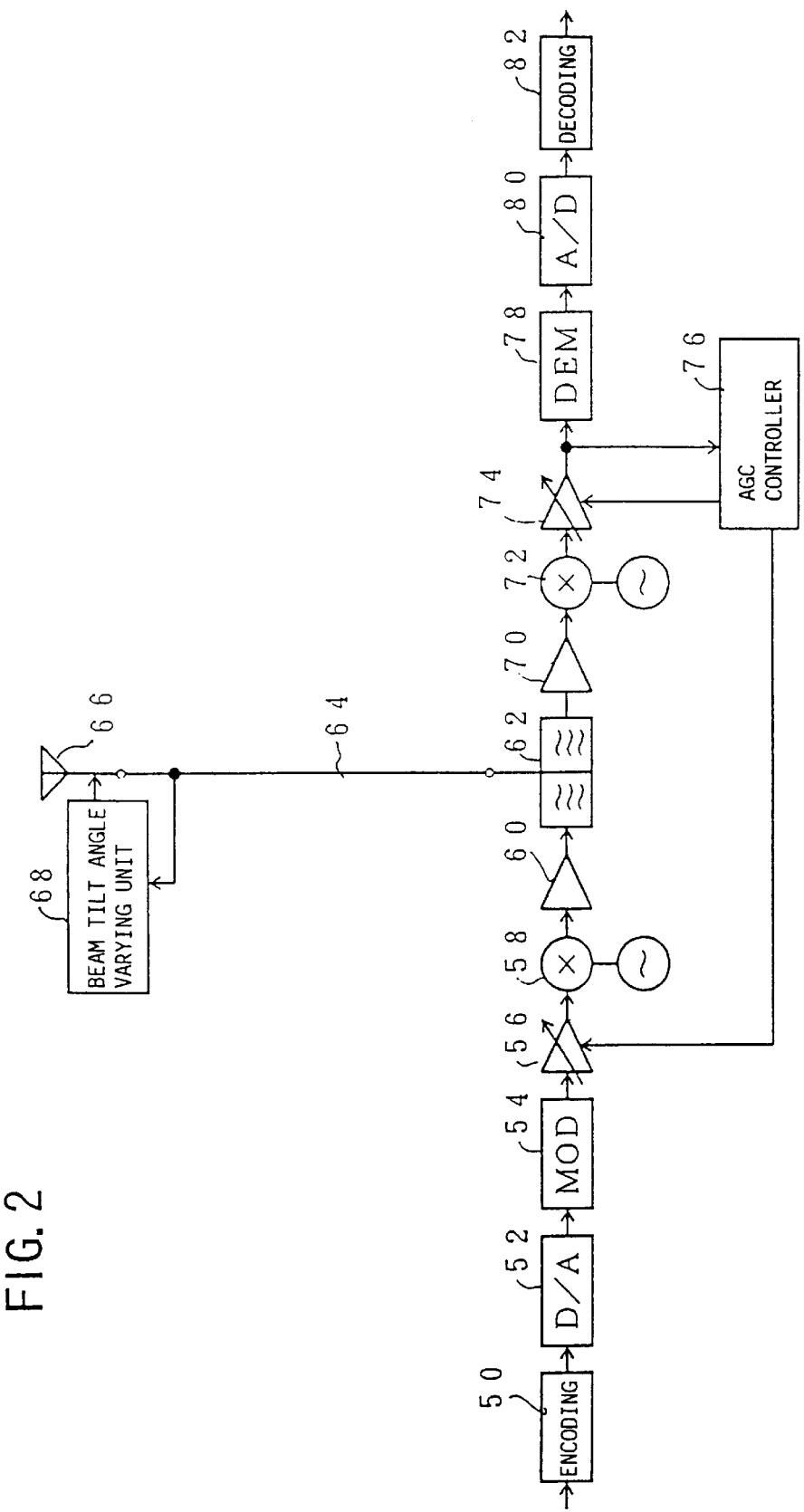
FIG. 2 is a block diagram of a CDMA wireless base station equipment according to the embodiments of the present invention.

FIG. 2 is a block diagram of a CDMA wireless base station equipment according to the embodiments of the present invention. Referring to FIG. 2, data to be transmitted is encoded by an encoder 50 using spread spectrum technique and is converted into an analog signal by a D/A converter 52. A modulator 54 modulates the analog signal using, for example, quadrature modulation technique whereby the analog signal is modulated using two sets of encoding data. The modulated signal is amplified by a variable-gain amplifier 56 and is turned into a high-frequency signal by a frequency converting circuit 58. The high-frequency signal is amplified by a high-power amplifier (HPA) 60 and is supplied to a beam tilt antenna 66 via a duplexer 62 and a coaxial cable 64. The beam tilt antenna is provided with a beam tilt angle varying unit 68 for varying the beam tilt angle.

The high-frequency signal received via the beam tilt antenna 66 is supplied to a low-noise amplifier (LNA) 70 via the coaxial cable 64 and the duplexer 62. The signal amplified by the low-noise amplifier 70 is turned into an IF signal by a frequency converting circuit 72. The IF signal is amplified by an AGC amplifier 74. The IF signal output by the AGC amplifier 74 is supplied to an AGC controller 76. The AGC controller 76 detects the IF and supplies a control signal for controlling the gain of the AGC amplifier 74 so that an average level of detection, that is, the received power is at a predetermined level. In the CDMA system, the received power is a sum of the received power in the code channels.

The IF signal output from the AGC amplifier 74 is supplied to a demodulator 78 for quadrature demodulation. The demodulated signal is converted into a digital signal by an A/D converter 80. A decoder 82 decodes the digital signal using the spread spectrum technique so as to retrieve and output the received data.

Figure 3A:
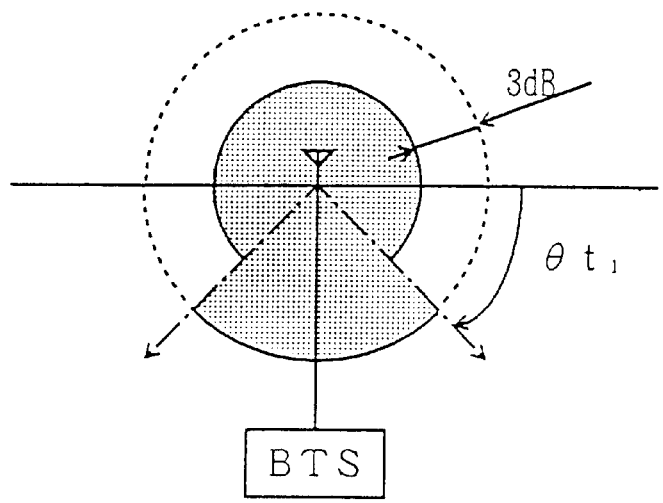
FIG. 3A shows a maximum beam tilt angle.
Figure 3B:
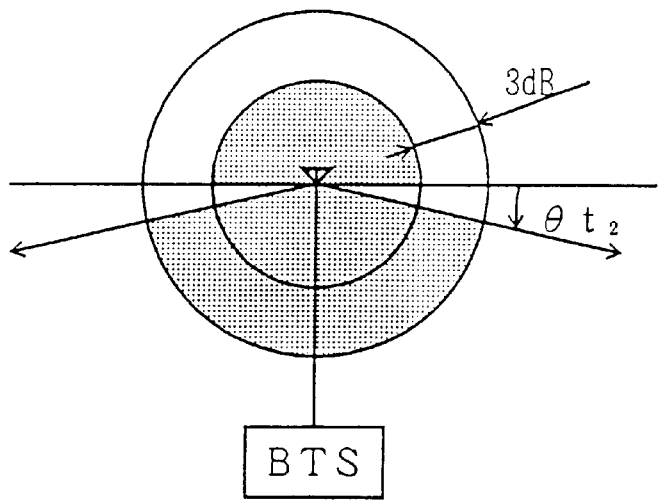
FIG. 3B shows a minimum beam tilt angle.
Figure 3C:
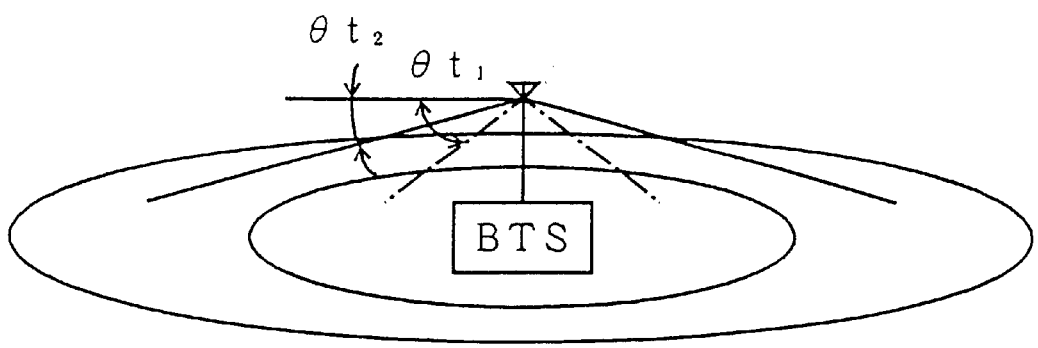
FIG. 3C shows how a cell size varies depending on the beam tilt angle.

In addition to supplying the control signal for controlling the gain of the AGC amplifier 74, the AGC controller 76 also supplies a control signal for controlling the variable-gain amplifier 56. In this way, the gain of the variable-gain amplifier 56 and the AGC amplifier 74 is increased or decreased simultaneously. When the number of used channels is relatively small, the received power is relatively small because, in CDMA, the received power is a sum of the received power of the coded channels. When a relatively small number of channels are used, the AGC controller 76 increases the gain of the AGC amplifier 74 and also increases the gain of the variable-gain amplifier 56. When a relatively large number of channels are used, the gain of the AGC amplifier 74 and the variable-gain amplifier 56 is decreased. The AGC amplifier 74, the AGC controller 76 and the variable-amplifier 56 constitute transmission power controlling means as claimed. The beam tilt angle varying unit 68 (beam tilt angle varying means as claimed) varies the tilt angle of the beam tilt antenna 66 in accordance with the transmission power supplied via the coaxial cable 64. The beam tilt angle varies between a maximum of $\theta t_1$ as shown in FIG. 3A (low transmission power) and a minimum of $\theta t_2$ (high transmission power). The beam tilt angle is an angle formed between the horizontal plane and a plane where the electric field intensity of transmission is higher than an ambient level by 3 dB. As shown in FIG. 3C, the beam tilt angle of $\theta t_1$ produces a small cell size and the beam tilt angle of $\theta t_2$ produces a large cell size.

The number of users UN, an index of channel capacity, is given by:

$$UN = \frac{(W/R) \cdot Ga \cdot Gv}{(Eb/I_0) \cdot (1+f)} \quad (1)$$

where W indicates a spread band width, R indicates a data rate, Ga indicates an antenna sectorization gain, Gv indicates a voice activity gain, $Eb/I_O$ indicates a signal/noise ratio per a bit, and f indicates an interference factor indicating an interference from other cells. Assuming that (W/R), Ga, Gv and $Eb/I_O$ are constant, f=0.55 when the antenna gain is 0 dB, and f=0.275 when the antenna gain is 3 dB. By changing the antenna gain from 0 dB to 3 dB, the number of users UN increases by about 20% since ((1.55/1.275)−1)×100=21.6.

Figure 4:
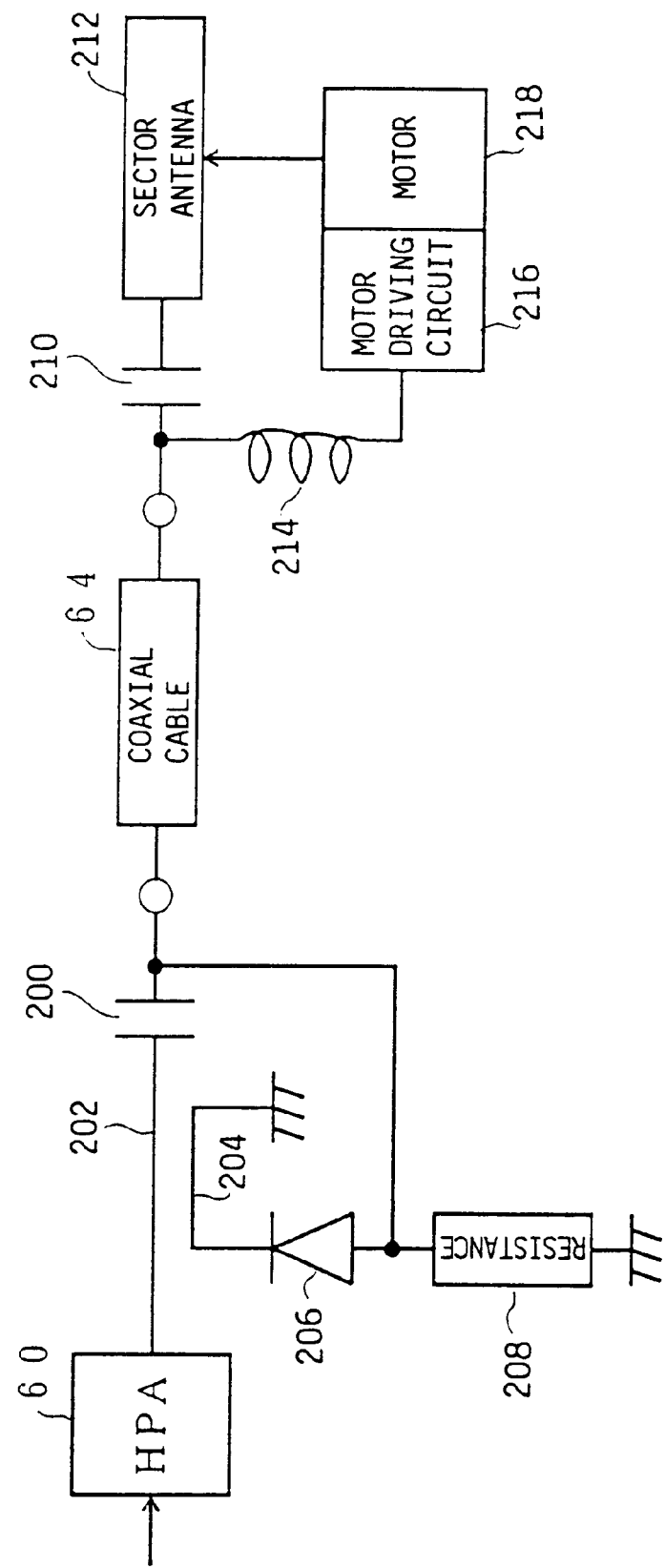
FIG. 4 is a circuit diagram showing a beam tilt antenna and a beam tilt angle varying unit according to a first embodiment of the present invention.

FIG. 4 is a circuit diagram showing the beam tilt antenna 66 and the beam tilt angle varying unit 68 according to a first embodiment of the present invention. Referring to FIG. 4, a high-frequency signal output from the high-power amplifier 60 is supplied to the coaxial cable 64 via a dc reject capacitor C1. The output terminal of the high-power amplifier 60 is connected to the capacitor C1 by a microstrip line 202. The microstrip line 202 is provided with a λ/4 coupler 204. The high-frequency signal induced in the λ/4 coupler 204 is detected by a diode (detecting means as claimed) 206 connected to the λ/4 coupler 204. A resistor 208 is provided to obtain a detection voltage. A contact between the diode 206 and the resistor 208 is connected to the coaxial cable 64 so that the detection voltage is supplied to the coaxial cable 64.

The other end of the coaxial cable 64 is connected to a sector antenna 212 constituting the beam tilt antenna 66 and is connected to a motor driving circuit 216 via an ac reject coil 214. With this arrangement, the high-frequency signal output from the high-power amplifier 60 is supplied to the sector antenna 212 and the voltage detected by the diode 210 is supplied to the motor driving circuit 216. The motor driving circuit 216 rotates a motor 218 to a position that corresponds to the detected voltage. The angle of the sector antenna 212 is determined by a position at which the motor 88 is rotated by the motor driving circuit 216.

Figure 5A:
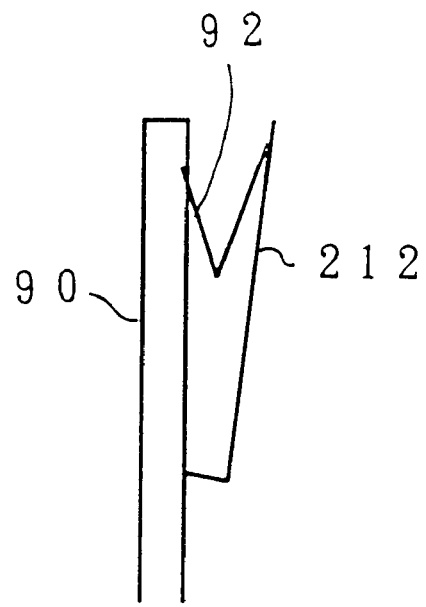
FIG. 5A shows how a sector antenna is fitted to an antenna fitting mast to provide a minimum beam tilt angle of $\theta t_2$.
Figure 5B:
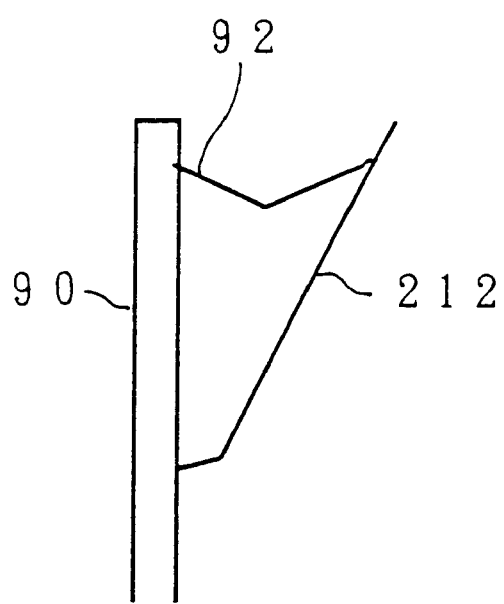
FIG. 5B shows how the sector antenna is fitted to the antenna fitting mast to provide a maximum beam tilt angle of $\theta t_1$.
Figure 6:
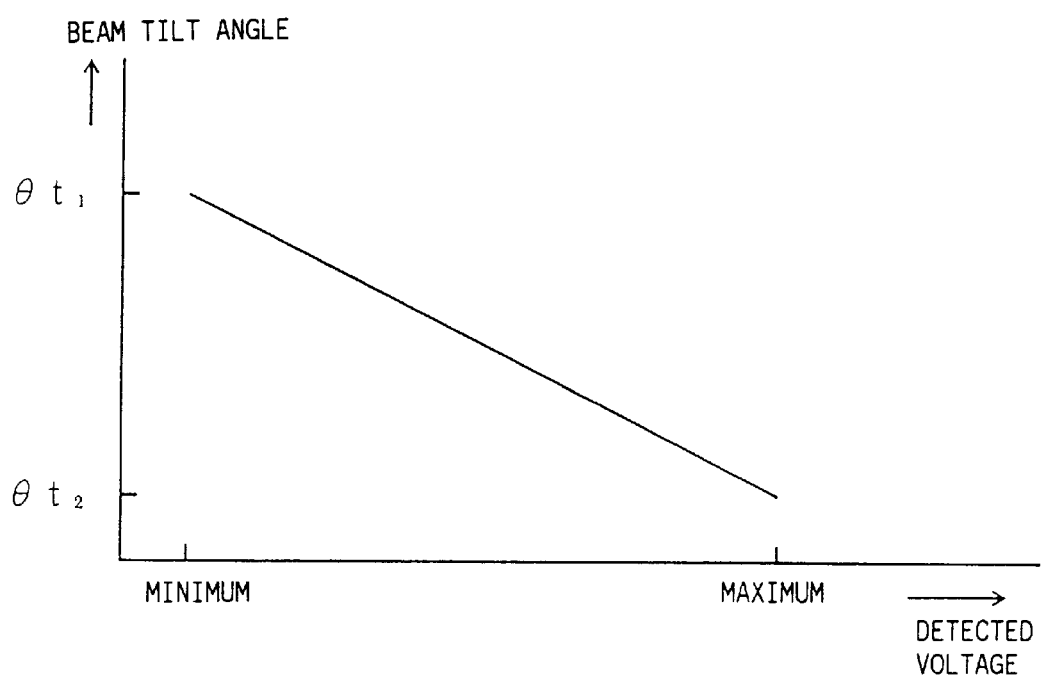
FIG. 6 is a graph showing a relationship between a detected voltage and a beam tilt angle of the sector antenna.

FIG. 5A shows the sector antenna 212 fitted to an antenna fitting mast 90 and controlled to provide the minimum beam tilt angle of 74 $t_2$. FIG. 5B shows how the sector antenna 212 fitted to the antenna fitting mast 90 and controlled to provide the maximum beam tilt angle of $\theta t_1$. While FIGS. 5A and 5B show only one sector antenna 212 fitted to the antenna fitting mast 90, a plurality of sector antennas 212 are actually fitted to the antenna fitting mast 90 at regular intervals so as to surround the antenna fitting mast 90. A beam tilt angle varying arm 92 is driven by the motor 218 to control the angle of the sector antenna 212 with respect to the antenna fitting mast 90 so that the beam tilt angle ranges between the minimum of $\theta t_2$ and the maximum of $\theta t_1$. The motor driving circuit 216, the motor 218 and the beam tilt angle varying arm 92 constitute an antenna fitting angle varying mechanism as claimed. FIG. 6 is a graph showing the relationship between the detected voltage and the beam tilt angle of the sector antenna 212.

The $\lambda/4$ coupler 204, the diode 206, the resistor 208, the motor driving circuit 216, the motor 218, the beam tilt angle varying arm 92 constitute the beam tilt angle varying unit 68. The maximum beam tilt angle $\theta t_1$ and the minimum beam tilt angle $\theta t_2$ are chosen in consideration of the maximum cell size, the minimum cell size and the geography.

In the CDMA system, the received power derived from the signals received by the base station from the mobile stations is controlled to be substantially constant. The base station achieves this by controlling the transmission power of the mobile stations using control data sent to mobile stations in accordance with the intensity of spectrum-spread encoded signals from the mobile stations. The variable control of the transmission power of the mobile stations takes place at intervals of, for example, several milliseconds. The beam tilt angle control takes place at intervals of 10 to 100 minutes.

When a relatively large number of channels are used and the received power is relatively high accordingly, the transmission power is reduced and the beam tilt angle of an antenna is controlled to be relatively large. Accordingly, the cell size is reduced and the received power deriving from the spurious radiation from the mobile stations outside the cell is reduced, preventing the channel capacity from being reduced due to the spurious radiation.

When a relatively small number of channels are used and the received power is relatively low accordingly, the transmission power is increased and the beam tilt angle of an antenna is controlled to be relatively small. Accordingly, the cell size is enlarged so that the channel capacity is increased, that is, transmission to and reception from the mobile stations in the enlarged cell is enabled.

One conceivable approach could be that the transmission power is maintained constant so that the cell size is reduced or enlarged by varying only the beam tilt angle. In this approach, if the transmission power is configured to be suitable for an enlarged beam tilt angle and a reduced cell size, a significant attenuation in the transmission power is caused for mobile stations in the cell at a relatively great distance from the base station as the beam tilt angle is decreased and the cell size is enlarged accordingly. In this case, communication with those mobile stations is likely to be disabled.

If the transmission power is configured to be suitable for a reduced beam tilt angle and an enlarged cell size, transmission power that exceeds a minimum transmission power enabling proper reception is supplied from the base station to all the mobile stations in the cell as the beam tilt angle is increased and the cell size is reduced accordingly. Excessive transmission power is the cause of waste of the power resource. Therefore, variable control of the transmission power and variable control of the beam tilt angle of an antenna should best be carried out simultaneously as in the present invention.

Figure 7:
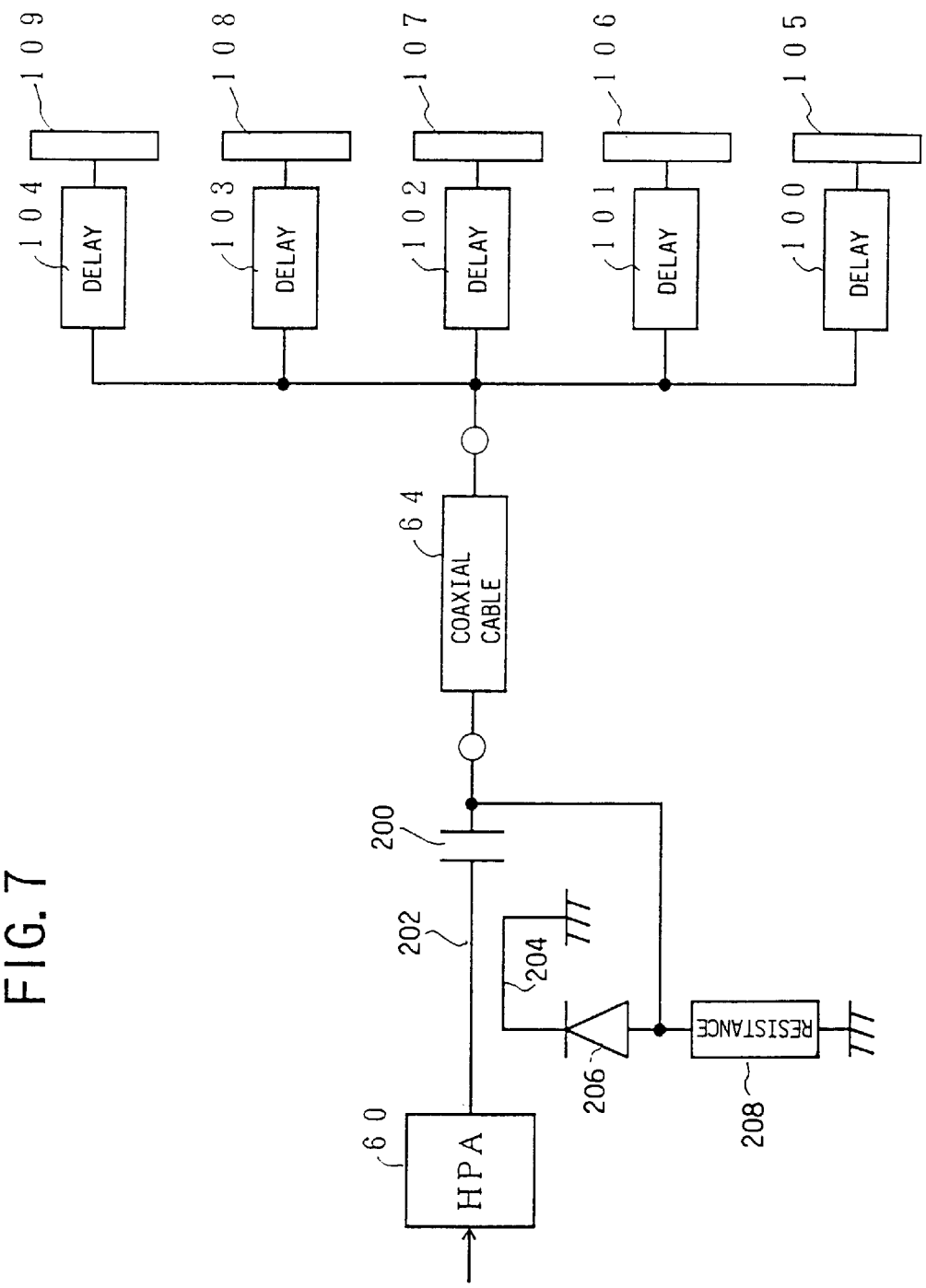
FIG. 7 is a circuit diagram showing a beam tilt antenna and a beam tilt angle varying unit according to a second embodiment of the present invention.

FIG. 7 is a circuit diagram showing the beam tilt antenna 66 and the beam tilt angle varying unit 68 according to a second embodiment of the present invention. Referring to FIG. 7, a high-frequency signal output from the high-power amplifier 60 is supplied to the coaxial cable 64 via the dc reject capacitor C1. The output terminal of the high-power amplifier 60 is connected to the capacitor C1 by the microstrip line 202. The microstrip line 202 is provided with the $\lambda/4$ coupler 204. The high-frequency signal induced in the $\lambda/4$ coupler 204 is detected by the diode 206 (detecting means) connected to the $\lambda/4$ coupler 204. The resistor 208 is provided to obtain a detection voltage. A contact between the diode 206 and the resistor 208 is connected to the coaxial cable 64 so that the detection voltage is supplied to the coaxial cable 64.

Figure 8:
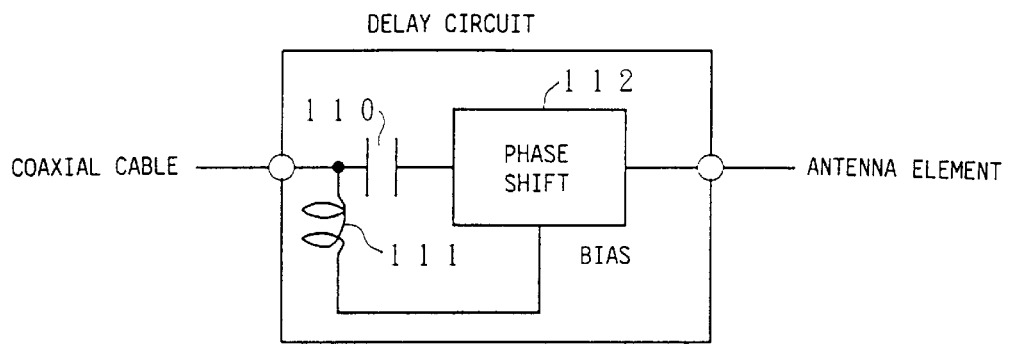
FIG. 8 shows a construction of a delay circuit according to the second embodiment.

The other end of the coaxial cable 64 is connected to antenna elements 105–109 via delay circuits 100–104, respectively. The antenna elements 105–109 are dipole antennas, for example. Each of the delay circuits 100–104 has a construction as shown in FIG. 8. Referring to FIG. 8, a dc reject capacitor 110 retrieves a high-frequency signal supplied from the coaxial cable 64 and supplies the retrieved signal to a phase shifter 112. The ac reject coil 111 retrieves the detected voltage supplied from the coaxial cable 64 and supplies the detected voltage to the phase shifter 112 as a bias voltage. A delay provided by the phase shifter 112 to the high-frequency signal is in proportion to the detected voltage supplied as the bias voltage. The delayed high-frequency signal is supplied to the antenna element.

Figure 9:
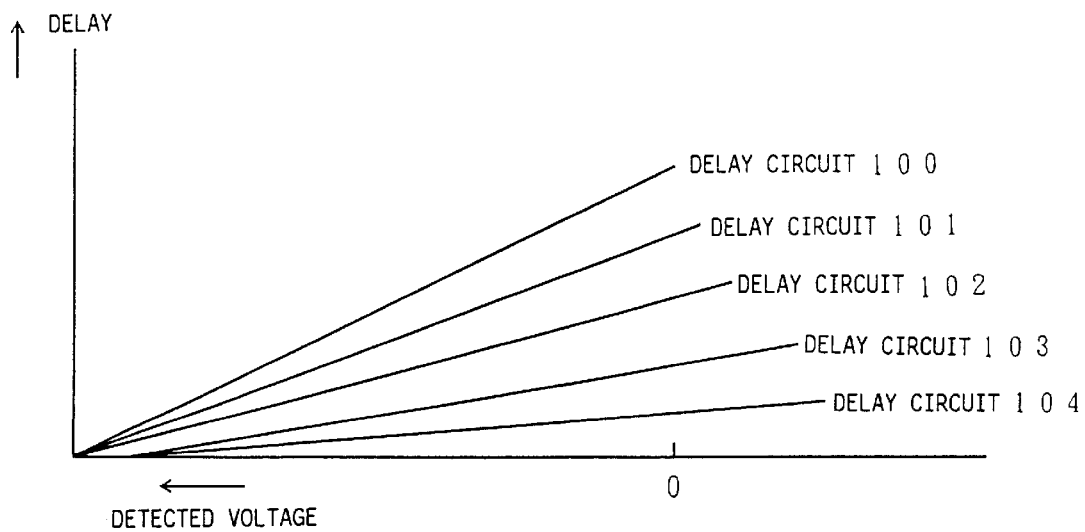
FIG. 9 is a graph showing a relationship between a detected voltage and a delay according to the second embodiment.

The relationship between the delay provided by the circuits 100–104 and the detected voltage is as shown in FIG. 9. Given an arbitrary detected voltage, the largest delay is provided by the delay circuit 100, with the delay circuits 101, 102, 103 and 104 in that order. The antenna elements 105, 106, 107, 108 and 109 are fitted adjacent to each other to the antenna mast in the ascending order of height from the ground. The antenna element at a higher position is associated with a larger delay per a given detected voltage than the lower antenna element. Thus, the beam tilt angle can be varied as shown in FIGS. 3A through 3C such that the higher the detected voltage, the smaller the delay and the beam tilt angle.

The $\lambda/4$ coupler 204, the diode 206, the resistor 208, the delay circuits 100–104 constitute the beam tilt angle varying unit 68. The antenna elements 105–109 constitute the beam tilt antenna 66.

The second embodiment described above ensures that the beam tilt angle is changed electrically. Therefore, variable control of the beam tilt angle can be executed accurately and promptly. Reliability of the beam tilt angle control remains unchanged even after a considerable time has elapsed. Instead of the vertical sector antennas provided equidistance from each other on the mast, a single omniantenna with a 360° coverage around the mast may be provided.

Figure 10:
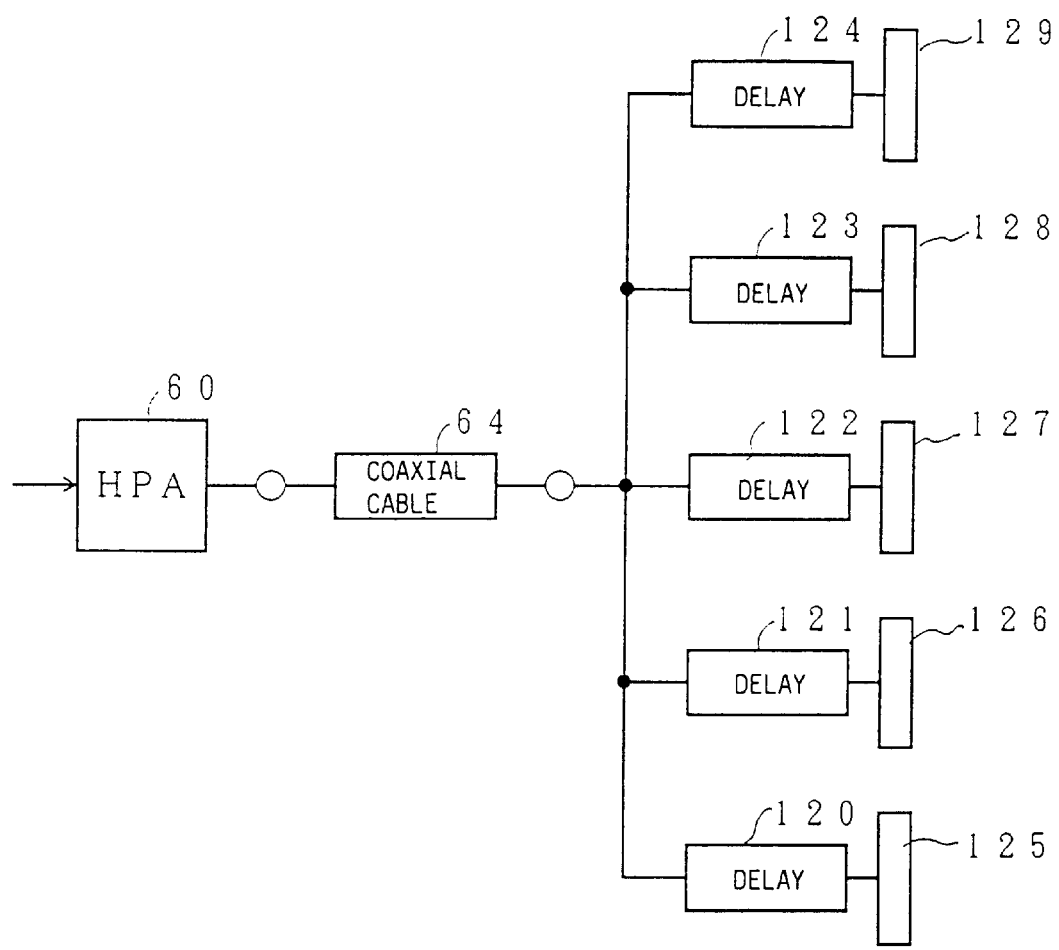
FIG. 10 is a circuit diagram showing a beam tilt antenna and a beam tilt angle varying unit according to a third embodiment of the present invention.
Figure 11:
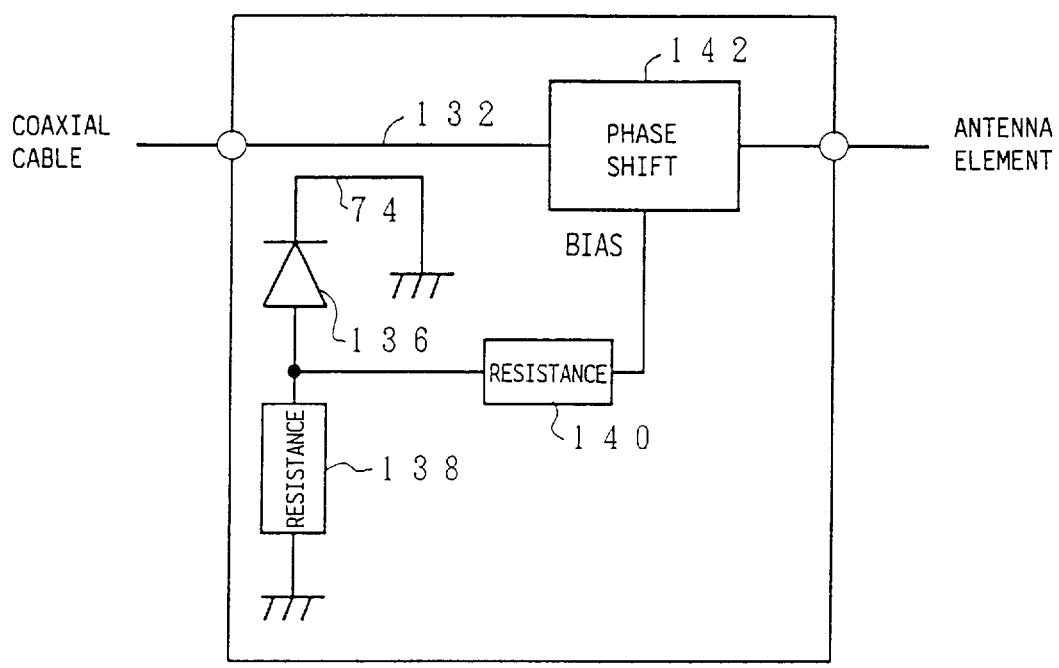
FIG. 11 shows a construction of a delay circuit according to the third embodiment.

FIG. 10 is a circuit diagram of the beam tilt antenna 66 and the beam tilt angle varying unit 68 according to a third embodiment of the present invention. Referring to FIG. 10, the output terminal of the high-power amplifier 60 is connected to an end of the coaxial cable 64. The other end of the coaxial cable 64 is connected to antenna elements 125–129 via delay circuits 120–124, respectively. The antenna elements 125–129 are dipole antennas, for example. Each of the delay circuits 120–124 has a construction as shown in FIG. 11. Referring to FIG. 11, the coaxial cable 64 is connected to a phase shifter 142 via a microstrip line 132. The microstrip line 132 is provided with a λ/4 coupler 134. The high-frequency signal induced in the λ/4 coupler 134 is detected by a diode 136 connected to the λ/4 coupler 134. A resistor 138 is provided to obtain a detected voltage. A contact between the diode 136 and the resistor 138 is connected to a bias input terminal of the phase shifter 142 via the resistor 140. The detected voltage is supplied to the phase shifter 142 as a bias voltage via the resistor 140. A delay provided by the phase shifter to the high-frequency signal is in proportion to the bias voltage to the phase shifter 142. The delayed high-frequency signal is supplied to the antenna element.

Figure 12:
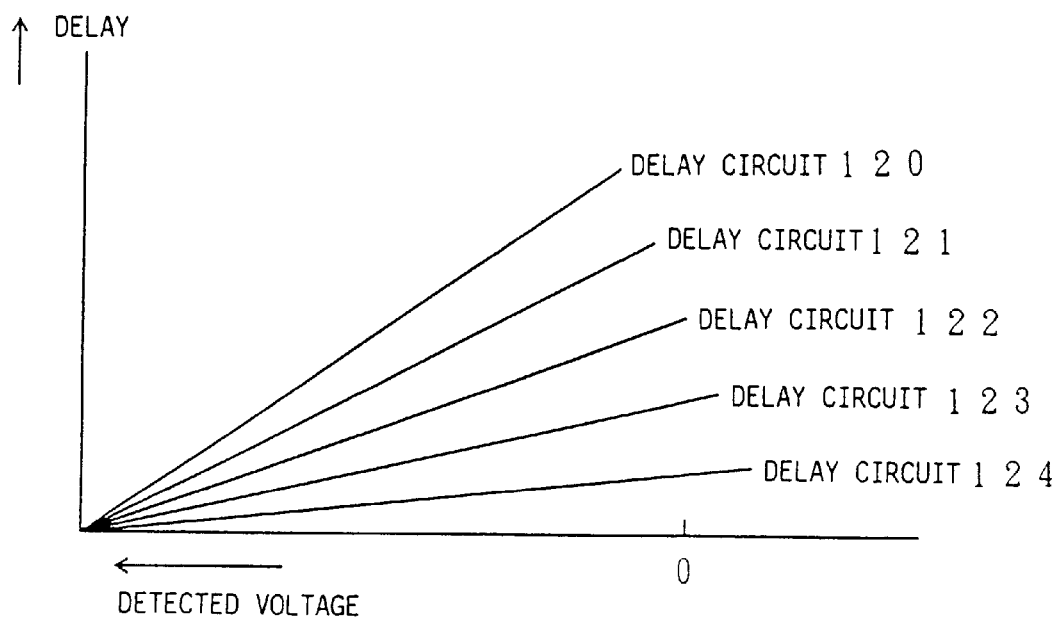
FIG. 12 is a graph showing a relationship between detected voltage and a delay according to the third embodiment.

The relationship between the delay provided by the circuits 120–124 and the detected voltage is as shown in FIG. 12. The gradient of the curves in FIG. 12 may be controlled by varying the resistance of the resistor 140. Given an arbitrary detected voltage, the largest delay is provided by the delay circuit 120, with the delay circuits 121, 122, 123 and 124 in that order. The antenna elements 125, 126, 127, 128 and 129 are fitted adjacent to each other to the antenna mast in the ascending order of height from the ground. The antenna element at a higher position is associated with a larger delay per a given detected voltage than the lower antenna element. Thus, the beam tilt angle can be varied as shown in FIGS. 3A through 3C such that the higher the detected voltage, the smaller the delay and the beam tilt angle. The delay circuits 120–124 constitute the beam tilt angle varying unit 68. The antenna elements 125–129 constitute the beam tilt antenna 66.

In the third embodiment, the detected voltage is obtained relatively close to the phase shifter 142. Thus, even if the length of the coaxial cable 64 varies from one base station to another and attenuation in the transmission power due to the coaxial cable 64 varies accordingly, the detected voltage corresponding to the transmission power can be properly obtained. Thus, the antenna beam tilt angle adapted for the transmission power can be properly set up.

Figure 13:
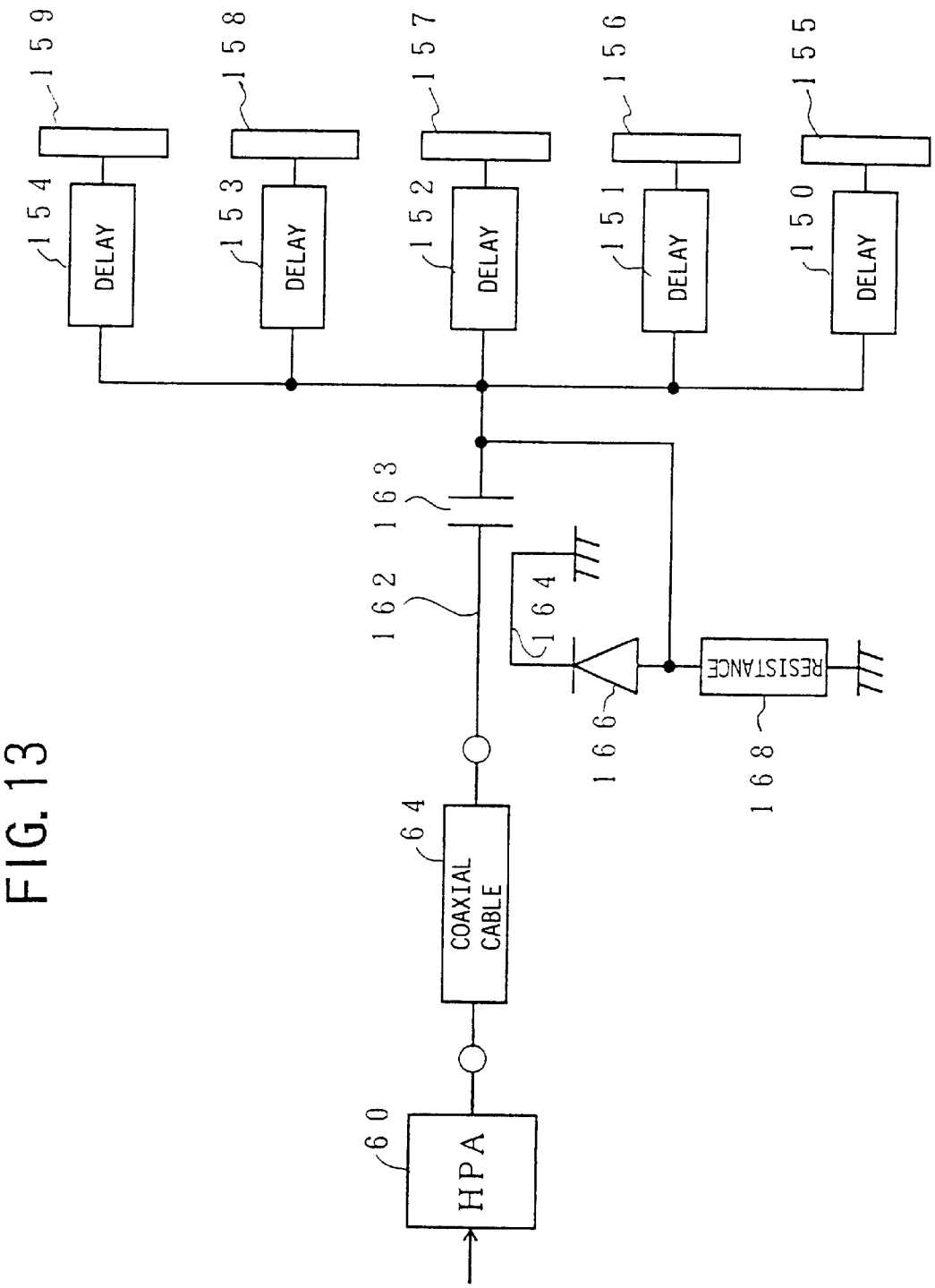
FIG. 13 is a circuit diagram showing a beam tilt antenna and a beam tilt angle varying unit according to a fourth embodiment of the present invention.

FIG. 13 is a circuit diagram showing the beam tilt antenna 66 and the beam tilt angle varying unit 68 according to a fourth embodiment of the present invention. Referring to FIG. 13, the output terminal of the high-power amplifier 60 is connected to an end of the coaxial cable 64. The other end of the coaxial cable 64 is connected to delay circuits 150–154 via a microstrip line 162 and a dc reject capacitor 163. The delay circuits 150–154 are connected to antenna elements 155–159, respectively. The antenna elements 155–159 are dipole antennas, for example. The microstrip line 162 is provided with a λ/4 coupler 164. The high-frequency signal induced in the λ/4 coupler 164 is detected by a diode 166 connected to the λ/4 coupler 164. A resistor 166 is provided to obtain a detected voltage. A contact between the diode 166 and the resistor 166 is connected to the delay circuits 150–154.

Figure 14:
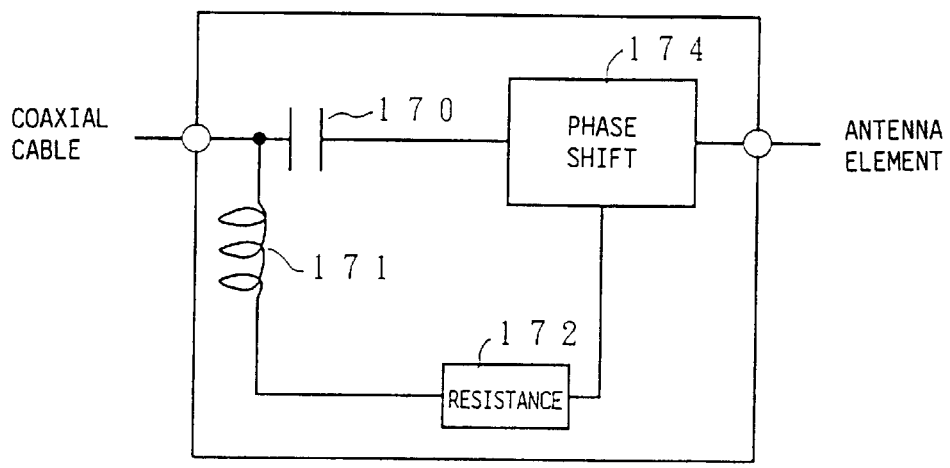
FIG. 14 shows a construction of a delay circuit according to the fourth embodiment.

Each of the delay circuits 150–154 has a construction as shown in FIG. 14. Referring to FIG. 14, a dc reject capacitor 170 retrieves a high-frequency signal supplied via the capacitor 163 and supplies the same to a phase shifter 174. An ac reject coil 171 retrieves the detected voltage and supplies the same to the phase shifter 174 as a bias voltage via a resistor 172. A delay provided by the phase shifter 174 to the high-frequency signal is in proportion to the bias voltage. The delayed high-frequency signal is supplied to the antenna element.

The delay circuits 150–154 and the antenna elements 155–159 are formed on the same printed board.

Figure 15:
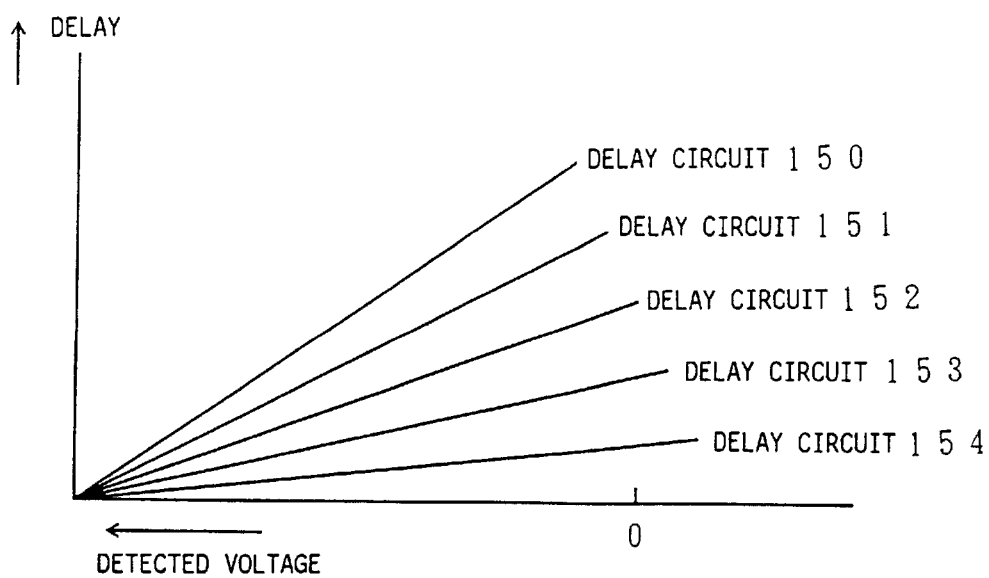
FIG. 15 is a graph showing a relationship between a detected voltage and a delay according to the fourth embodiment.

The relationship between the delay provided by the circuits 150–154 and the detected voltage is as shown in FIG. 15. The gradient of the curves in FIG. 15 may be controlled by varying the resistance of the resistor 172. Given an arbitrary detected voltage, the largest delay is provided by the delay circuit 150, with the delay circuits 151, 152, 153 and 154 in that order. The antenna elements 155, 156, 157, 158 and 159 are fitted adjacent to each other to the antenna mast in the ascending order of height from the ground. The antenna element at a higher position is associated with a larger delay per a given detected voltage than the lower antenna element. Thus, the beam tilt angle can be varied as shown in FIGS. 3A through 3C such that the higher the detected voltage, the smaller the delay and the beam tilt angle. The λ/4 coupler 162, the diode 166, the resistor 168 and the delay circuits 150–154 constitute the beam tilt angle varying unit 68. The antenna elements 155–159 constitute the beam tilt antenna 66. In the fourth embodiment, the λ/4 coupler, the diode and the resistor are shared by the delay circuits.

Figure 16:
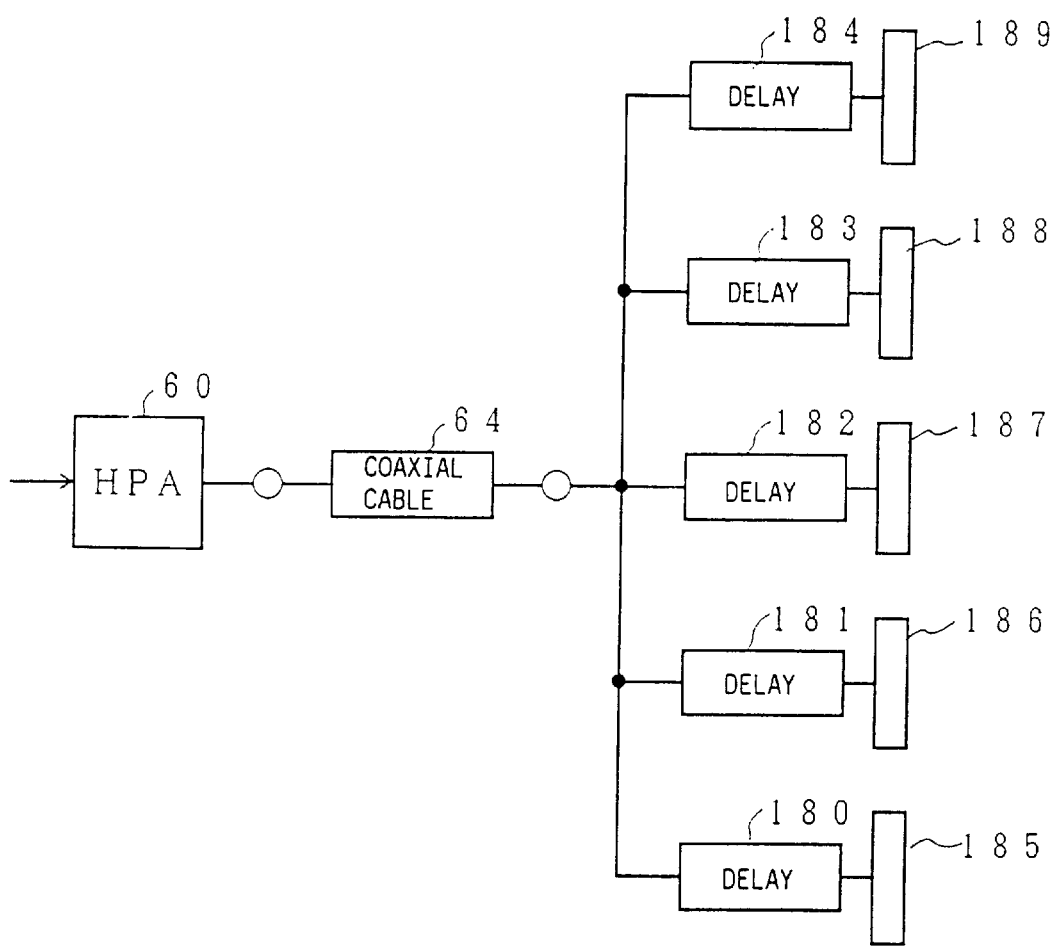
FIG. 16 is a circuit diagram showing a beam tilt antenna and a beam tilt angle varying unit according to a fifth embodiment of the present invention.

FIG. 16 is a circuit diagram showing the beam tilt antenna 66 and the beam tilt angle varying unit 68 according to a fifth embodiment of the present invention. Referring to FIG. 16, the output terminal of the high-power amplifier 60 is connected to an end of the coaxial cable 64. The other end of the coaxial cable 64 is connected to antenna elements 185–189 via delay circuits 180–184, respectively. The antenna elements are dipole antennas, for example.

Figure 17:
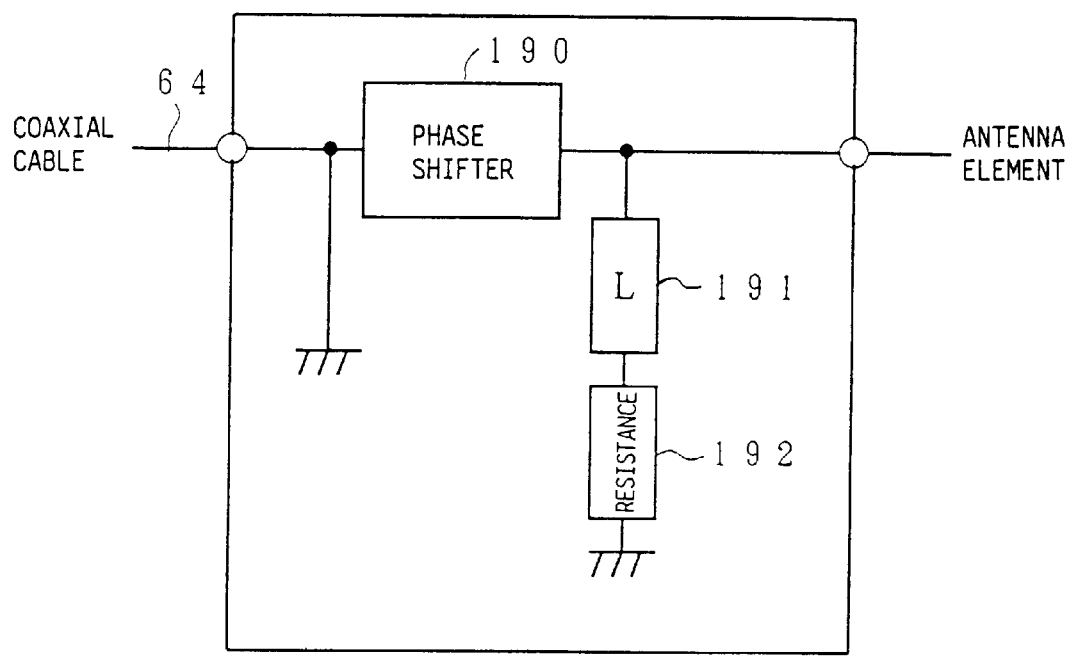
FIG. 17 shows a construction of a delay circuit according to the fifth embodiment.

Each of the delay circuits 180–184 has a construction as shown in FIG. 17. Referring to FIG. 17, the end of the coaxial cable 64 is connected to a phase shifter 190. The phase shifter 190 is formed of diodes. An input terminal of the phase shifter 190 connected to the coaxial cable 64 is grounded, and an output terminal thereof connected to the antenna element is grounded via a high-frequency cut-off coil 191 and a resistor 192 so as to form a dc loop. When an input power for the phase shifter 190 increases, the current flowing through the resistor 192 via the high-frequency cut-off coil 191, that is, the self-bias current for the diodes of the phase shifter 190, is increased. Accordingly, a phase shift occurs such that the delay provided by the diodes of the phase shifter 190 becomes small. The high-frequency signal delayed by the phase shifter 190 is supplied to the antenna element.

Figure 18:
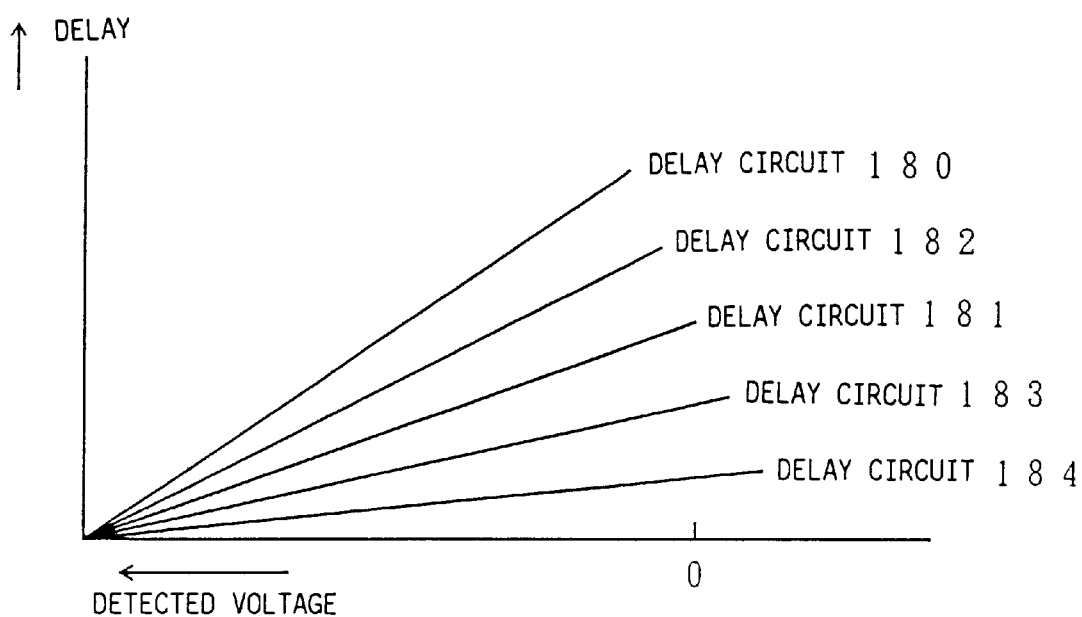
FIG. 18 is a graph showing a relationship between a detected voltage and a delay according to the fifth embodiment.

The relationship between the delay provided by the delay circuits 180–184 and the detected voltage (bias voltage) is as shown in FIG. 18. Given an arbitrary detected voltage, the largest delay is provided by the delay circuit 180, with the delay circuits 181, 182, 183 and 184 in that order. The antenna elements 185, 186, 187, 188 and 189 are fitted adjacent to each other to the antenna mast in the ascending order of height from the ground. The antenna element at a higher position is associated with a larger delay per a given detected voltage than the lower antenna element. Thus, the beam tilt angle can be varied as shown in FIGS. 3A through 3C such that the higher the detected voltage, the smaller the delay and the beam tilt angle. The delay circuits 180–184 constitute the beam tilt angle varying unit 68. The antenna elements 185–189 constitute the beam tilt antenna 66. In the fifth embodiment, the construction of each of the delay circuits 180–184 is relatively simple so that the size and the cost of the base station can be reduced.

The present invention is not limited to the above described embodiments, and variations and modifications may be made without departing from the scope of the present invention.

What is claimed is:

1. A wireless base station equipment comprising:

transmission power controlling means for controlling a transmission power of a transmitted signal to be transmitted to a mobile station in accordance with a status of signal reception from the mobile station; and beam tilt angle varying means for varying a beam tilt angle of an antenna formed with respect to a horizontal plane, based on the level of transmission power control by said transmission power controlling means.

2. The wireless base station equipment as claimed in claim 1, wherein said transmission power controlling means reduces the transmission power when a received power is high, and said beam tilt angle varying means varies the beam tilt angle such that the lower the transmission power, the larger the beam tilt angle.

3. The wireless base station equipment as claimed in claim 1, wherein said transmission power controlling means increases the transmission power when a received power is low, and said beam tilt angle varying means varies the beam tilt angle such that the higher the transmission power, the smaller the beam tilt angle.

4. The wireless base station equipment as claimed in claim 1, wherein said beam tilt angle varying means comprises:

detecting means for detecting said transmitted signal to be transmitted from said antenna; and an antenna fitting angle varying mechanism for varying an angle with which said antenna is fitted to a mast depending on an output signal from said detecting means.

5. The wireless base station equipment as claimed in claim 1, wherein said antenna is an array antenna formed of a plurality of antenna elements; and said beam tilt angle varying means comprises:

detecting means for detecting said transmitted signal to be transmitted from said antenna; and a plurality of delaying means for determining a delay for a corresponding one of said plurality of antenna elements, providing the delay to said transmitted signal and supplying the delayed signal to the corresponding one of said plurality of antenna elements.

6. The wireless base station as claimed in claim 5, wherein said detecting means is provided in the vicinity of said plurality of antenna elements.

7. The wireless base station as claimed in claim 1, wherein said antenna is an array antenna formed of a plurality of antenna elements; and said beam tilt angle varying means is formed of a phase shifter supplied with said transmitted signal to be transmitted from said antenna, applying a phase shift to said transmitted signal and supplying said phase-shifted signal to a corresponding one of said plurality of antenna elements, a variation in a power of said transmitted signal causing a self-bias for said phase shifter and the phase shift provided thereby to be varied.

* * * * *